United States Patent

Schneider

[11] Patent Number: 5,963,687
[45] Date of Patent: Oct. 5, 1999

[54] ARRANGEMENT FOR PRODUCING A CONVERSION BETWEEN LIGHT RAYS HAVING A SMALL BEAM CROSS-SECTION AND A LIGHT RAY HAVING A LARGE BEAM CROSS-SECTION AND A METHOD OF MAKING THE ARRANGEMENT

[75] Inventor: Hartmut Schneider, Munich, Germany

[73] Assignee: Siemens Aktiengesellschaft, Munich, Germany

[21] Appl. No.: 08/939,525

[22] Filed: Sep. 29, 1997

[30] Foreign Application Priority Data

Sep. 30, 1996 [DE] Germany ............... 196 40 253

[51] Int. Cl.[6] .................................................. G02B 6/26
[52] U.S. Cl. ........................... 385/31; 385/14; 385/15
[58] Field of Search ................................ 385/31, 14, 15, 385/20, 21, 24

[56] References Cited

U.S. PATENT DOCUMENTS 5,577,140  11/1996  Endo et al. ............................. 385/31

Primary Examiner—Phan T. H. Palmer
Attorney, Agent, or Firm—Hill & Simpson

[57] ABSTRACT

An arrangement which converts a plurality of light beams having a small beam cross-section into a light beam having a larger cross-section comprises a plurality of waveguide cores with each core having a first end face which is oblong and arranged for receiving light from each of the light rays having the smaller beam cross-section and each core has a second end face which are arranged together and extend in a different direction than the first end faces for coupling light with the beam having the large beam cross-section. Preferably, each of the cores is fashioned in the form of a bisphenoid so that the first and the second core end faces are oblong in directions extending perpendicular to one another.

11 Claims, 4 Drawing Sheets

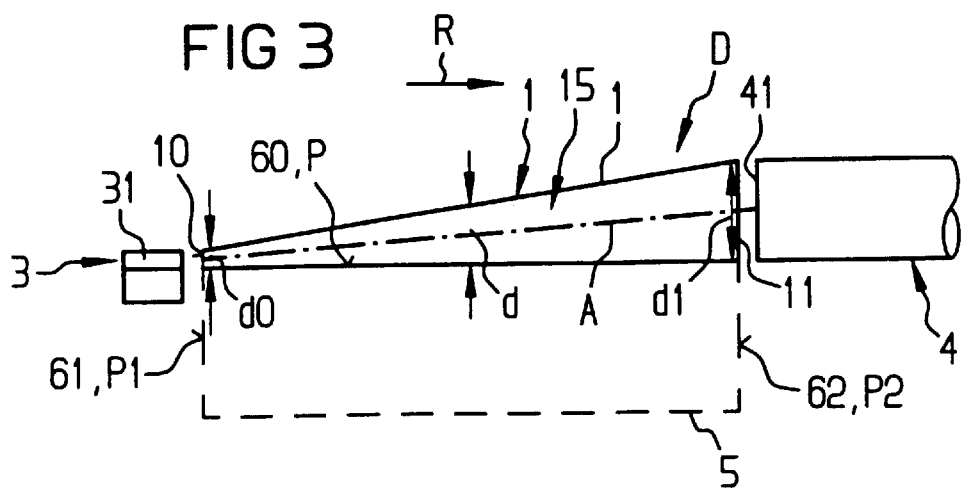
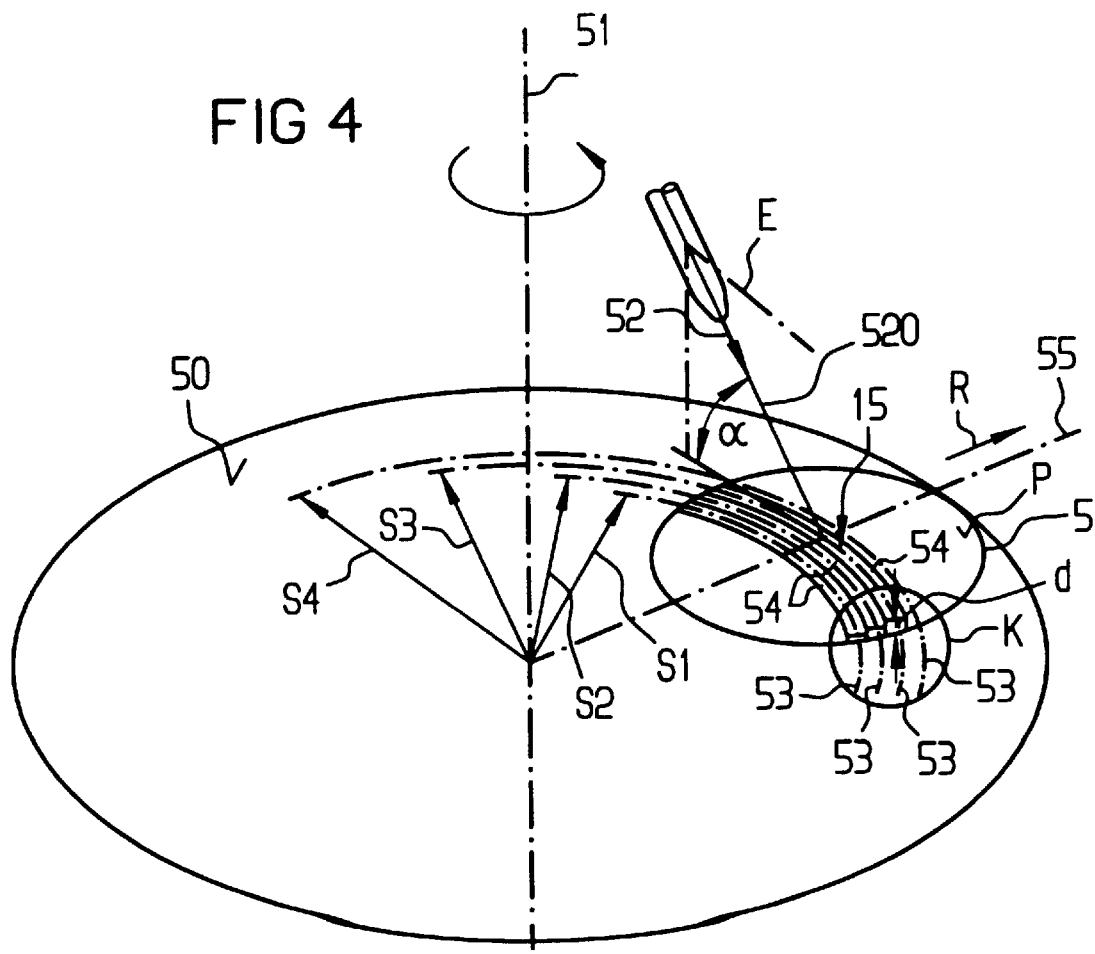

ARRANGEMENT FOR PRODUCING A CONVERSION BETWEEN LIGHT RAYS HAVING A SMALL BEAM CROSS-SECTION AND A LIGHT RAY HAVING A LARGE BEAM CROSS-SECTION AND A METHOD OF MAKING THE ARRANGEMENT

BACKGROUND OF THE INVENTION

The present invention is directed to an arrangement for producing a conversion of a plurality of light rays having a small beam cross-section into a light ray having a larger beam cross-section and/or for conversion of a light ray having a large beam cross-sections into a plurality of light rays which have smaller beam cross-section and to a method for manufacturing the arrangement.

German 196 12 673 discloses an arrangement for converting a plurality of individual light rays into a single light ray having a larger cross-section. In this known arrangement, oblong cores and end faces allocated to the light rays having the respectively smaller light beam cross-sections are arranged spaced next to one another on a plane which is allocated in common to the light ray guide cores. The core end faces which are allocated to the light ray having the larger beam cross-section are therefore elongated in a direction parallel to the plane allocated in common to the light waveguide cores and are arranged in a stack one on top of another in different planes parallel to the first plane and arranged spaced one above one another in the direction perpendicular to the first plane.

An article by Chen et al "Design approaches for laser-diode material-processing systems using fibers and micro-optics", OPTICAL ENGINEERING, Vol. 33, No. 11 November, 1997, pages 3662–3669 discloses an arrangement that is composed of a bundle of optical core-cladded optical fibers each of which has a circular core and end faces surrounded by an optical cladding. The core and end faces allocated to the plurality of light waveguides having respectively smaller beam cross-sections are arranged in a plane allocated in common for these fibers where as the core and end faces allocated to the light ray having the larger beam cross-section are arranged in a circular area defined by circular bundling of the fibers so that these core end faces are arranged in different planes that are parallel to the planes allocated in common for the fibers and are arranged spaced one above the other in the direction perpendicular to this plane.

An article by Yamaguchi, et al, "Collimation of emissions from a high-power multistripe laser-diode bar with multi-prism array coupling and focusing to a small spot", OPTICS LETTERS, Vol. 20, No. 8, Apr. 15, 1997, pages 898–900, discloses that a plurality of light rays having a respectively smaller beam cross-section can be rotated by 90° with the assistance of micro-prisms, so that these light rays can be combined by a number of prisms to form a light ray having a rectangular, larger beam cross-section.

SUMMARY OF THE INVENTION

To accomplish the goals of the present invention, each waveguide core has a first oblong end face and a second oblong end face extending at an angle to the first end face. Therefore, the second core end faces allocated to the light ray having the larger beam cross-section can be advantageously arranged side-by-side parallel to a plane extending at an angle to the plane allocated in common to the light waveguide cores, so that an arrangement of these second core end faces in various planes that are parallel to the plane allocated in common to the light waveguide cores and that are arranged spaced above one another perpendicular to the plane can be avoided.

In the inventive arrangement, each light waveguide core is constructed so that a light ray having a smaller beam cross-section that is coupled into the core through one or first of the two core end faces and whose beam cross-section is elongated in the same direction as this one core end face will be coupled out from the other or second core end face after passing through the core as a light ray having a beam cross-section that, like the second core end face, is elongated in a different direction.

The light ray having the larger beam cross-section is composed of a totality of light rays that emerge from the second core end faces of all light waveguide cores allocated to the light ray having the larger beam cross-section, and these individual light rays will exhibit a cross-section that is elongated in a different direction than the first core end face allocated to the light ray having the respectively smaller beam cross-section.

Despite the side-by-side arrangement of the second core end faces allocated to the light ray with the larger beam cross-section in the plane allocated to the light waveguide cores, a larger beam cross-section can be obtained in this way and will exhibit a larger diameter in a direction extending perpendicular to this plane.

So that a mode mixing without inadmissible power losses will occur in a waveguide core from one core end face to another, it is necessary that the core cross-sections of each and every waveguide core changes along the core longitudinal axis essentially continuously from a geometrical shape of the one or first core end face into the geometrical face of the other or second core end face.

In order to obtain a light ray having an optimally compact, large beam cross-section, it is expedient when the second core end faces of the waveguide cores allocated to the light ray having the larger beam cross-section are elongated in a direction allocated in common to the waveguide cores, and this direction is preferably perpendicular to the plane allocated in common to the waveguide cores at the opposite end.

The beam cross-section of the light ray becomes all the more compact the more densely the second core end faces of the waveguide cores allocated to the light ray having the larger cross-section are arranged relative to one another.

The light ray having a gap-free, larger beam cross-section can be obtained when the second core end faces of the waveguide cores allocated to the light ray with the larger beam cross-section are arranged together following one another in a gap-free manner in a direction extending parallel to the plane allocated in common to the waveguide cores.

Although it is not necessary, it is nonetheless expedient in many instances when the second core end faces of each and every waveguide core allocated to the light ray having the larger beam cross-section is arranged to extend perpendicular to the longitudinal core axis of the waveguide core, since a beam-deflecting refraction does not occur at this core end face and this core end face can be butt-coupled to an end face of a continuing optical waveguide, for example an optical fiber.

An especially advantageous embodiment of the inventive arrangement is constructed to have the first core end faces of the waveguide cores allocated to the light rays having the smaller beam cross-section arranged at a greater distance from one another compared to the light ray having a larger cross-section. The longitudinal core axes and, with them, the waveguide cores between these core end faces proceed in a curved path so that the longitudinal core axes are parallel to one another at the second core end faces allocated to the light rays having the larger beam cross-section and at the first core end faces allocated to the light rays having the smaller beam cross-section.

When, in this case, the second core end faces of the waveguide cores allocated to the light ray having the larger beam cross-section are perpendicular to the longitudinal core axes, this light ray having the larger beam cross-section advantageously emerges from these second core end faces parallel to one another and parallel to the axis of these longitudinal core axes.

On the other hand, each like ray having a smaller beam cross-section can enter parallel to the axis of the longitudinal core axis of the particular waveguide core through the first core end face of the waveguide which is allocated to this light ray when the first core end face extends perpendicular to the axis of the core.

It is expedient in view of the mode mixing in a core when the core cross-section of the waveguide core comprises a cross-sectional area that remains essentially constant along the longitudinal core axis. The preferred embodiment has the waveguide core fashioned so that the two core end faces of the waveguide core are each respectively essentially rectangularly elongated and the core cross-section of this waveguide core remains essentially rectangular along its longitudinal core axes.

For facilitating the mode mixing in a core, it is advantageous when means for facilitating a mode mixing in the waveguide core is provided at or along the waveguide core. Such means for facilitating the mode mixing can be constructed in a great variety of ways.

An inventive arrangement is advantageously employed for producing the conversion of the plurality of light rays having a respectively small beam cross-section into a single light ray having a larger beam cross-section. This arrangement is preferably constructed for the purpose that each of the plurality of light rays of the respectively smaller beam cross-section is generated by a respective line of semiconductor sources arranged side-by-side which extend in a direction parallel to a plane allocated in common to the waveguide cores and the output of the line of semiconductor sources is coupled in through the first core end faces allocated to this light ray having the small beam cross-section. The second core end faces allocated to the light ray having the larger beam cross-section and elongated in the another direction in the waveguide cores allocated to the light waveguide are dimensioned in such terms of their length and arranged in close proximity to one another so that they essentially fit into the core cross-section of the waveguide core of the multimode waveguide, for example an optical fiber. Thus, the waveguide ray having the larger beam cross-section coupled out of these cores in common is coupled into the multimode waveguide.

The semiconductor light sources are preferably semiconductor lasers that is a compact light source having a high irradiance and can be practically utilized in many ways. For example, semiconductor lasers wherein the laser light is emitted by a line-shaped light spot can be arranged at such a slight distance, for example, 10 $\mu$m from one another in a line. The line-shaped light spots will then be arranged parallel to one another and preferably perpendicular to the plane allocated in common to the light waveguide cores. In common, such individual array of semiconductor lasers can emit a light ray having a smaller beam cross-section that has an optical power of 1 to 2 watts. When respectively one such individual array is allocated to each of the two or more waveguide cores, an increase in the power can be achieved that advantageously suffices for processing materials when the light rays having the respectively smaller beam cross-section generated by these individual arrays are concentrated by the arrangement to form a light ray having a relatively larger cross-section. Typically, the line-shaped light spot of each and every semiconductor laser of the individual array is 1 to 2 $\mu$m high and the line established by the individual array is approximately 200 $\mu$m long. The individual array emits in a solid angle that exhibits a larger aperture angle, for example 30 to 40°, perpendicular to the common plane than parallel to this plane, wherein the aperture angle amounts to 5 to 10°. With the inventive device, the optical power emitted by an individual ray can be coupled, for example, into a fiber without loss in power and irradiance.

An individual arrangement can be advantageously manufactured in an especially cost-beneficial way exclusively with methods of planar technology and, as a monolithic component part, is especially rugged by contrast to fiber bundles, and therefore a high optical power density can be achieved. Given realization in planar technology, the inventive arrangement is preferably fashioned so that the plane allocated in common to the waveguide cores is defined by a surface of a substrate on which the waveguide cores are constructed. The method preferably suitable for manufacturing the arrangement comprises providing a layer composed of a layer material for formation of the layer cores that is produced on a surface of the substrate and the layer increases from a smaller layer thickness essentially continuously to a larger layer thickness in a specific direction parallel to the surface of the substrate. The layer is structured into one or more layer strips respectively forming the waveguide cores on the surface and each stripe proceeds along the longitudinal axis for a layer end face comprising a smaller thickness and elongated in a direction parallel to the plane allocated in common to the waveguide cores defining a first core end face allocated the light ray having the smaller cross-section to a layer end face exhibiting the greater layer thickness that defines the second core end face of the waveguide core allocated to the light rays having the larger beam cross-section which second core end face is elongated in a direction of the greater layer thickness and whose length is equal to this greater layer thickness.

This method, however, assumes a method for manufacturing a layer on a surface of a substrate with a predetermined layer thickness profile exhibiting a changing layer thickness, and then structuring the layer into one or more waveguide cores. Let it be pointed out in this context that both an article by Kawachi, "Silica waveguides on silicon and their application to integrated-optic components", *Optical and Quantum Electronics,* Vol. 22, No. 5, September, 1990, pages 391–416 and an article by Schneider, "Realization of $SiO_2$—$B_2O_3$—$TiO_2$ waveguides and reflectors on Si substrates" *Optical Waveguide Materials, Material Research Society Symposium Proceedings* Vol. 244, 1992, pages 337–42, disclose manufacturing a layer by a material depositing beam for depositing material forming a layer with a constant layer thickness. However, these two references do not disclose employing the material deposit beam for providing a predetermined layer thickness profile exhibiting a changing layer thickness. Preferably, the material is deposited in strips on a track with the material deposition beam covering the track immediately joining the one track for the deposition of a strip of material having a layer thickness different than the adjacent track. The surface of the substrate and the material deposit beam are turned relative to one another around a rotational axis intersecting the surface at different radial spacings of the material deposition beam from the rotational axis so that the material deposit beams cover different concentric circular-shaped tracks on the surface of the substrate and a circular arc-shaped strips of the layer material are deposited with the layer thickness allocated to that particular track. The change in the thickness of each track can be obtained by covering the track with additional layers or by changing the speed of movement relative between the beam and the track to create a different thickness.

The inventive arrangement advantageously offers a beam-shaping element that can be especially cost-beneficially manufactured only with methods of planar technology and that, as a monolithic component part, is especially rugged by contrast to fiber bundles. In addition, the high power density can be achieved with this element. The inventive arrangement can also be operated in reverse, for example for producing a plurality of separate light rays each having a respectively smaller beam cross-section from a light ray having a larger beam cross-section.

BRIEF DESCRIPTION OF THE DRAWINGS

FIG. 3 is a side view of an arrangement according to FIG. 2 extending along one of the longitudinal cores of the waveguide cores;

FIG. 4 is a schematic, perspective view of an arrangement for producing a layer on a surface of the substrate having a predetermined layer thickness profile exhibiting a changing layer thickness that is employed for manufacturing the arrangement of FIGS. 1–3;

DESCRIPTION OF THE PREFERRED EMBODIMENTS

Figure 1:
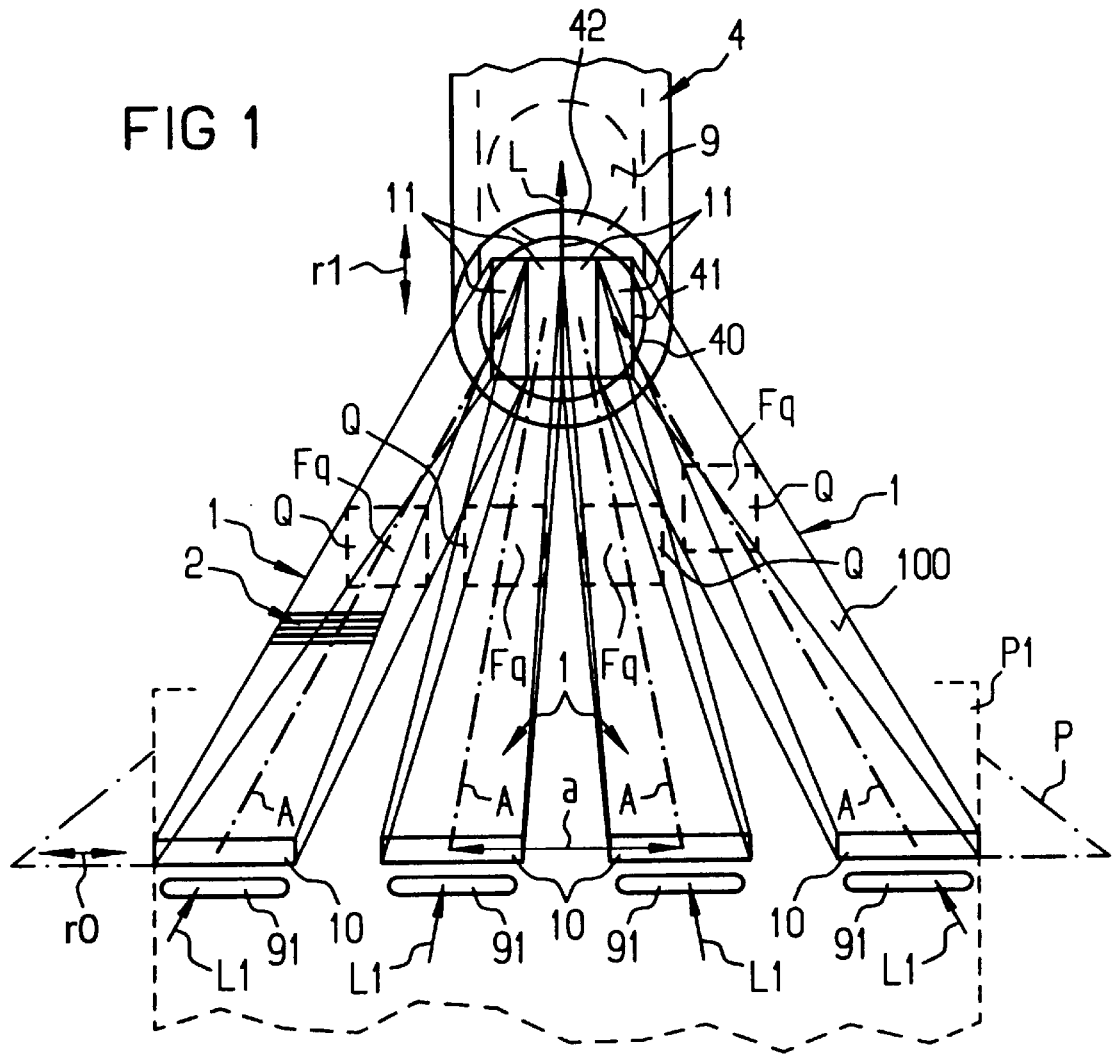
FIG. 1 is a schematic perspective view of the basic structure of the arrangement according to the present invention.

The principles of the present invention are particularly used for one incorporating an arrangement schematically shown in FIG. 1 for generating a conversion of four light rays L1, which are separated from one another and have a small cross-sectional 91, into a light ray L having a larger beam cross-section 9.

One optical waveguide core 1 is provided per light ray L1 having the small beam cross-section 91. Each optical waveguide core 1 comprises a first core end face 10 fashioned of and allocated to this light waveguide beam L1 having the small beam cross-section 91 for the in-feed and/or out-feed of light into and out of the waveguide core 1. This end face 10 is elongated in a direction r0 which extends parallel to a plane P allocated in common to the waveguide cores 1.

Each waveguide core 1 also includes a second core end face 11 which is allocated to the light ray L having the larger beam cross-section 9 for the out-feed and/or in-feed of light out of or into this waveguide core 1. Each waveguide core 1 also includes a longitudinal core axis A extending between the two core end faces 10 and 11 and a core cross-section Q.

Light supplied into the waveguide core 1 through the core end faces 10 or 11 will propagate in this core 1 between its two core end faces 10 and 11 along the longitudinal core axis A and remain essentially within the core cross-section Q.

Inventively, the second core end face 11 of each waveguide core 1, which is arranged to be allocated to the light ray L having the larger beam cross-section 9, is fashioned respectively oblong in a second direction r1 which is different from the direction r0 of the first core end face 10. The shape of the core cross-section Q of each waveguide core 1 changes along its longitudinal core axis A essentially continuously from the geometrical shape of the core end face 10 or 11 into the geometrical face of the other core face 11 or, respectively, 10.

It is specifically established in the arrangement according to FIG. 1 that the other or second direction r1 in which the second core end face 11 of each core 1 allocated to the light ray L having the larger beam cross-section 9 is fashioned oblong is perpendicular to the plane P and, thus, is also perpendicular to the direction r0.

Each light ray L1 having the smaller beam cross-section 91 can be composed of an individual light ray or a plurality of individual light rays generated, for example, by different light sources. Each individual light ray can be divergent, convergent or collimated to form a parallel beam. The light rays L1 with the smaller beam cross-section 91 are separated from one another which means that the spacing between the neighboring light rays L1 of this type is greater than the spacing between potentially existing individual light rays within each light ray L1, so that the light rays L1 can always be discriminated as being separated from one another.

Dependent on whether there is a spacing between the second core end faces 11 of the waveguide cores 1 allocated to the light ray L or not, the light ray L having the larger beam cross-section 9 is a light ray composed of a plurality of individual light rays separated at least upon exit from the second core end faces 11 or in an individual light ray as a whole that can be respectively divergent, convergent or collimated to form a parallel beam.

The light ray L having the large beam cross-section 9 is also to be interpreted as a unit when it is composed of separate, individual light rays. However, each spacing between neighboring light rays of this type must be smaller than the spacing between neighboring light rays L1 having the respectively smaller beam cross-section 91.

What this means for the inventive arrangement itself is that the first core end faces 10 of the waveguide cores 1 allocated to the light rays L1 having the smaller beam cross-section 91 are arranged with a greater axial spacing a from one another than the second core end faces allocated to the light ray L having the larger beam cross-section 9.

Figure 2:
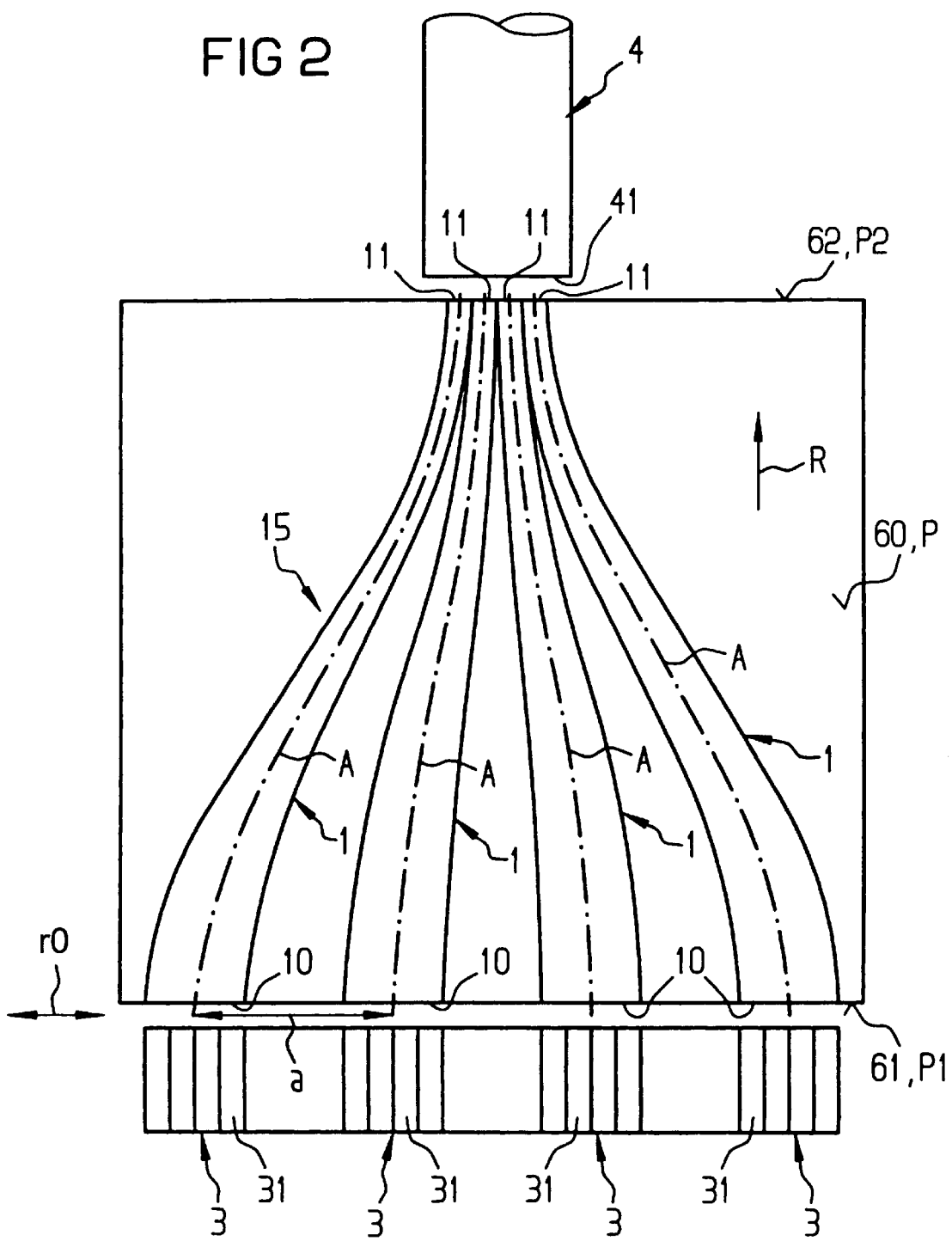
FIG. 2 is plan view of an exemplary embodiment of the arrangement according to the present invention which has light waveguide cores with core axes that have a curvature.
Figure 5:
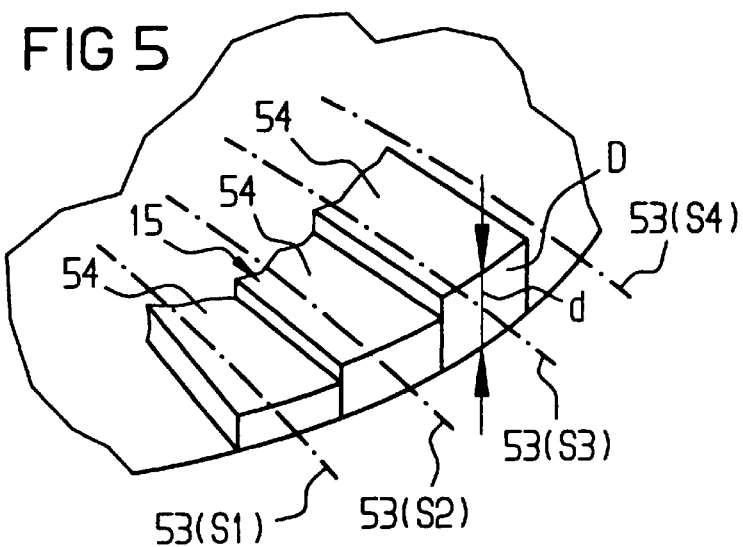
FIG. 5 is an enlarged perspective view of a portion within circle K of FIG. 4 to more clearly show the varying layer thickness of the layers already produced.

It is specifically established given the arrangements of FIGS. 1–3 that the first core end faces 10 allocated to the light rays L1 having the smaller beam cross-section 91 are arranged in a direction r0 in an apparatus plane P1 which extends perpendicular to the plane P allocated in common to the waveguide cores which are arranged therein with the same axial spacing a from one another followed by one another in the direction r0. The second core end faces 11, which are allocated to the light ray L having the larger beam cross-section 9, are arranged in an apparatus plane P2 which extends parallel to the apparatus plane P1. The second core end faces 11, which are allocated to the light ray L having the larger beam cross-section 9 are advantageously arranged in the apparatus plane P2 following one another gap-free in the direction r0 parallel to the plane P which is allocated in common to the waveguide cores 1, so that there is no spacing between these second core end faces 11, contrary to traditional arrangements.

The light ray L emerging from the second core end faces 11 adjoining one another gap-free exhibits a beam cross-section 9 that, in terms of shape and area, coincides with the shape and area of the second core end faces 11 adjoining one another in a gap-free manner. This cannot be achieved in the traditional arrangements since every core end face in a traditional arrangement is surrounded by a waveguide cladding having a non-disappearing thickness which results in that the core end faces cannot be adjoined gap-free.

As shown in FIG. 1, the rectangular second core end faces 11, which are allocated to the light ray L with the larger cross-section 9, can be dimensioned in terms of their length parallel to the direction r1 and in terms of their width parallel to the direction r0 that they form a common, quadratic light exit surface with one another from which the light ray L having the larger beam cross-section 9 will emerge as a uniform beam.

Moreover, this common quadratic exit face is dimensioned so that, as shown, it fits into a core end face 41 of a waveguide or fiber core 40 surrounded by a fiber cladding 42 of a multimode fiber 4, for example an optical fiber. The light ray L emerging from all the second core end faces 11 can advantageously be coupled into the multimode fiber 4 with a simple butt coupling and can be continued therein without the occurrence of optical power losses. This is also true of other multimode waveguides, for example waveguides in a planar technology, wherein care merely has to be exercised to see that the common exit face established by the second core end faces 11 of the waveguide cores 1 is matched in terms of shape and size to the core end face of the waveguide core of the multimode waveguide.

The step-free modification of the core cross-section Q of each waveguide core 1 along the longitudinal core axis A from the geometrical shape of one core end face 10 or 11 into the geometrical face of the other core face 11 or 12, must occur so that the plurality of modes conducted in the waveguide core 1, for example, the mode volume, remains constant along the longitudinal axis A. Although the characteristic mode of the waveguide 1 at the core end face 10 or 11 differs from those at the other core end face 11 or 10, the transition can be accomplished very slowly when the circumferential surface 100 of the waveguide core 1 comprises a slope of at most 1°, and preferably 0.5° relative to the longitudinal core axis A over the entire circumference.

Given the arrangement according to FIGS. 1 through 3, each waveguide core 1 becomes constricted wedge-shaped in a direction parallel to the plane P allocated in common to the waveguide cores 1 along the longitudinal direction A from the first core end face 10 to the second core end face 11. In addition, each waveguide core 1 expands in a direction perpendicular to the plane P so that the waveguide core forms so to speak a bisphenoid whereby the respective wedge angle is less than or equal to 1° and preferably less than or equal to 0.5° both parallel as well as perpendicular to the plane P.

Since an energy exchange between the guided modes is possible due to mode conversion, the guided energy along the waveguide core 1 distributes itself over and over again onto the continuously changing characteristic modes, so that mode mixing occurs. In the ideal case, the optical power remains constant along the waveguide core 1.

Given the advantageous embodiment of the inventive arrangement shown in FIGS. 2 and 3, the first end faces 10 of the waveguide cores 1 allocated to the light rays L1 having the smaller cross-section 91 are arranged from one another with the larger axial spacing a transverse relative to the longitudinal core axis A compared to the second core end faces 11 of the waveguide cores 1 allocated to the light ray L having the larger cross-section 9. In the longitudinal core axes A and, with them, the waveguide cores is perceived along a curved path between their core end faces 10 and 11, for example with an S-shaped. Thus, the longitudinal core axes A is parallel to one another at the second core end faces 11 allocated to the light ray L having the larger beam cross-section 9 and also at the first core end faces 10 allocated to the light rays L1 having the smaller beam cross-sections 91. This has the particular advantage that all second core end faces 11 as well as first core end faces 10 can be arranged perpendicular to the longitudinal core axes A.

In general, the waveguide cores 1 are expediently selected so that the core cross-section Q of a waveguide core 1 exhibits an essentially constant cross-sectional area Fq along the longitudinal core axis A. In the embodiments of FIGS. 1 through 3, the two core end faces 10 and 11 of each waveguide core 1 are respectively essentially elongated rectangles and the core cross-section Q of this waveguide core remains essentially rectangular along the longitudinal core axis A.

Each waveguide core 1 is preferably realized by a core/cladding waveguide composed of the core 1 and of an optical cladding surrounding the circumferential surface 100 thereof and composed of a material having an index of refraction that is lower compared to the index refraction of the material of the core 1.

According to what has been set forth above, the inventive arrangement offers an optical beam shaper having the form of an array of contra-directionally tapering waveguide cores 1. Each individual waveguide core 1 converges wedge-shaped in the plane and expands perpendicularly thereto to form a bisphenoid or a disphenoid. The two angles of each waveguide core 1 are thereby selected such that the cross-sectional area Fq of the cross-section Q of this core 1 remains constant along the propagation direction of the light guided in the core 1. Since the refractive index of each core 1 and the refractive index of the optical medium respectively surrounding it, for example of the optical cladding composed of the material having the lower refractive index compared to the material of the core, are constant along the longitudinal axis A, it is assured that the plurality of modes guided in the core 1, the mode volume, remains constant along the core 1. Although the characteristic mode of the core 1 at the input side differs from those on the output side, the transition is accomplished very slowly since the change in geometry occurs at a wedge angle of less than or equal to 1°. Since an energy exchange between the guided modes is possible due to mode conversion, the guided energy along the core 1 distributes over and over again onto the continuously changing characteristic mode, for example mode mixing occurs. In the ideal case, the power along the core 1 thereby remains constant. A radiation field thus arises at the output side of the core 1 that is directed differently than the radiation field at the input side of the core 1, for example vertical thereto.

A means 2 provided at a waveguide core 1 for facilitating a mode mixing in the core 1 can be realized, for example, in a manufactured-condition fluctuations both in the refractive index such as layer structure or granulation, as well as in the geometry of the boundary surface between the core and cladding being present at or in the waveguide core 1 or, respectively, a core/cladding waveguide containing this core 1. Differing from the extremely uniform optical fiber, these disturbances are especially pronounced, as known, given planar waveguides, which also account for the comparatively high line attenuation. Statistical disturbances such as thickness fluctuations, variations in index refraction or curvature can also be intentionally intensified during manufacture. However, regular disturbances can also be intentionally provided for the purpose of mode mixing.

Measured for intensified formation of the mode conversion that can be specifically introduced, particularly in the manufacture described later on are:

wave-shaped corrugations of the limitation between the core 1 and the surrounding cladding by rough sidewall etching and/or wave-shaped modulation of the mask edge of a mask employed in the manufacture and/or corrugations of upper and lower boundary surfaces by deposition of a rough glass layer as a foundation or cover or application of an upper or lower corrugation by etching transverse grooves, fluctuations in refractive index are promoted by especially thick, inherently non-uniform individual glass layers that can also be compelled by impressing a transverse lattice by UV-photochemically induced reactions in the glass, particularly between germanium and dissolved H2.

Given the embodiment of the inventive arrangement for producing a conversion of a plurality of light rays L1 having the respectively smaller beam cross-section 91 into a light ray L having a larger beam cross-section 9 shown in FIGS. 2 and 3, each of the plurality of light rays L1 of the respective smaller beam cross-section 91 is specifically generated by a respective line 3 of semiconductor light sources 31 arranged side-by-side that extend in the direction r0 parallel to the plane P allocated in common to the waveguide cores 1. These light rays L1 are coupled through the first core end faces 10 of the waveguides 1. As an example of FIG. 1 the second core end faces 11 of the waveguide cores 1, which are allocated to the light ray L having the larger beam cross-section 9, are elongated in the other direction r1 and are dimensioned in such terms of length and width that they are arranged at such a close proximity to one another that they essentially fit into the core end face 41 of the waveguide core 40 of the multimode waveguide 4. Thus, the light ray L having the larger beam cross-section 9 is coupled out in common from these second core end faces 11 of the waveguide cores 1 into the multimode waveguide 4.

The inventive arrangement exhibits the following advantages:

Since refractive indexes of core 1 as well as cladding remain constant on average along the longitudinal axis A, the numerical aperture can be adapted either in the multimode waveguide or at a radiation field of the light source. Butt coupling is thus possible. The matching occurs via a lens optics at the respective other transition.

The arrangement enables an especially high radiation density since cladding surfaces and interspaces at the out-feed and/or in-feed end, which are defined by the second core end faces 11 which are allocated to the light ray L having the larger beam cross-section 9, can be eliminated.

The in-feed or, respectively, out-feed side defined by the first core end faces 10, which are allocated to the light rays L1 having the respectively smaller beam cross-section 91, can be optimally adapted to the laser array in terms of geometry and acceptance angle.

Alternatively, the out-feed side can be optimally adapted to the multimode waveguide in terms of geometry and acceptance angle.

The matching to different laser arrays and multimode waveguides is possible by selecting the fan geometry of the fan formed by the waveguide cores and by selecting of the numerical aperture.

As a monolithic structure, which is fashioned in $SiO_2$ glass, free of connecting auxiliary materials, the arrangement is especially rugged.

The arrangement can be implemented in planar technology, whereby a cost-beneficial mass production is enabled.

Given this embodiment in planar technology, the arrangement is integrated on a preferably planar surface 60 of a substrate 5, as shown in FIGS. 2 and 3. The plane P allocated in common for the waveguide cores 1 is expediently defined by the surface 60 in this case. The apparatus planes P1 and P2 are defined by end faces or lateral faces 61 and 62, respectively, that are opposite one another.

In the manufacture of the inventive arrangement integral on a surface P of a substrate 5, one proceeds so that a layer 15 of a layer material provided with the formation of the waveguide cores 1 is manufactured on the surface P of the substrate 5. This layer 15 increases essentially continuously from a smaller layer thickness d0 to a greater layer thickness d1 in a specific direction R parallel to the surface P. Then this layer 15 is structured so that one or more layer strips respectively forming a waveguide core 1 occur on the surface P. Each of these strips proceeds along a longitudinal core axis from a layer end face exhibiting the smaller layer thickness d0 and elongated in the direction r0 parallel to the plane P allocated in common to the waveguide cores 1 and defining a first core end face 10 which is allocated to the light ray L1 having a smaller cross-section 91 to a layer end face exhibiting a larger layer thickness d1 that defines the second core end face 11 of the waveguide core 1 which second end face is allocated to the light ray L having the larger beam cross-section 9 and is elongated in the direction r1 with a length being equal to that of the larger layer thickness d1.

In manufacturing of the layer 15 on a surface P of a substrate 5 having a predetermined layer thickness profile D exhibiting a changing layer thickness d, one inventively proceeds so that the material deposition beam 52 (FIG. 4) for depositing a layer of material forming the layer 1 is directed onto the surface P and the material depositing beam 52 and the surface P are moved relative to one another so that a material deposition beam 52 covers predetermined tracks 53 on the surface P that proceed side-by-side. A stripe 54 of the layer material having a layer thickness d allocated to the track 53 is deposited on each track covered by the material deposition beam 52. After the deposition of a strip 54 on a track 53, the material deposition beam 52 passes over a different track 53 for depositing a different stripe 54 of the layer material having a layer thickness d for this other track 53. Thus, the layer thicknesses d allocated to the individual tracks 53 is selected so that they yield a predetermined layer thickness profile D together with one another.

After the deposition of a stripe 54 on a track 53, the material deposition beam 52 preferably covers a track 53 immediately neighboring this one track 53 for the deposition of a second stripe 54 of the layer material adjoining the stripe 54 deposited on the one track 53 and having a layer thickness d allocated to this immediately adjacent track 53.

Preferably and advantageously, the surface P and the material depositing beam 52 are rotated relative to one another around a rotational axis 51 which intersects the surface P at different radial spacings S1, S2 . . . S4 of the material deposition beam 52 from the axis 51. So that the material deposition beam 52 covers different, concentric, circular arc-shaped tracks 53 on the surface P, and a circular arc-shaped stripe 54 of the material having the layer thickness d allocated to this track 53 is deposited on each of these tracks.

A track 53 can be covered twice or multiple times by the material deposition beam 52 and the material deposition beam 52 travels over a track 53 with a speed allocated for this track 53.

The material deposition beam 52 is preferably directed onto a track 53 obliquely relative to the surface P so that the beam 520 of the material deposition beam 52 lies in a plane E that is tangential relative to the track 53 and extends perpendicular to the surface P. The beam 520 will form an angle α of less than 90° and greater than 0° with the surface.

Figure 6:
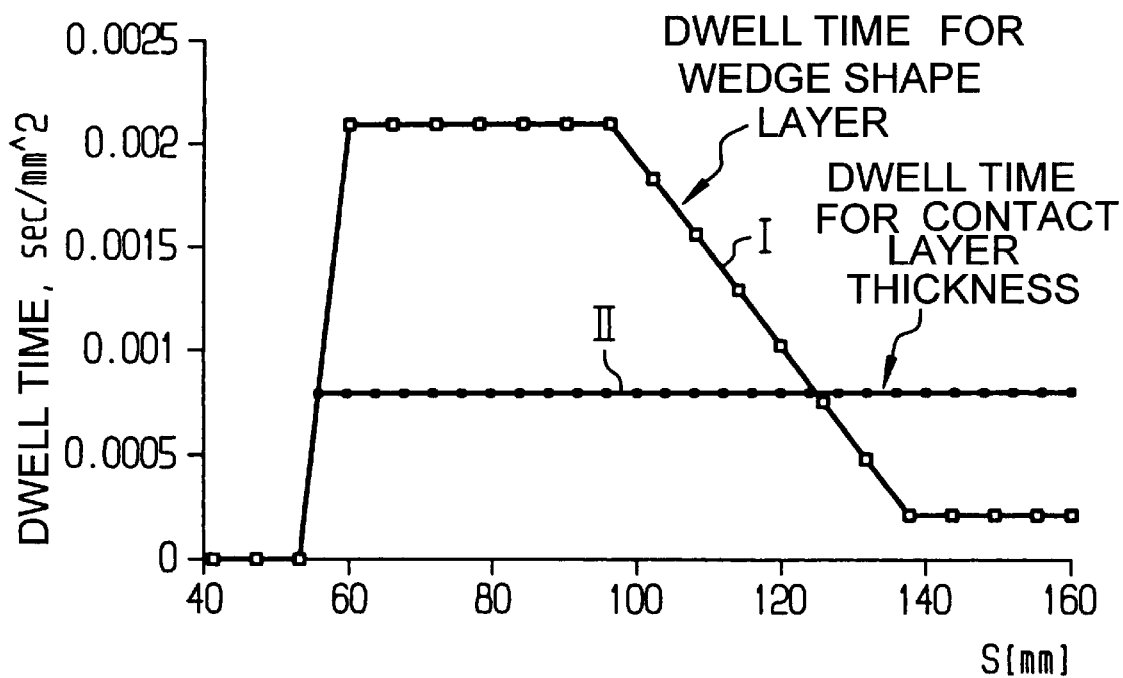
FIG. 6 is a diagram showing a dwell time dependent on the radial distance from the rotational axis of the device of FIG. 4 with the first curve being produced with one curve showing a linearly changing radial layer thickness and the other curve showing a constant thickness.

The described manufacture of the layer 15 is based on an improvement of the method that, for example, was disclosed in both the article by M. Kawachi and the article by H. W. Schneider which are mentioned hereinabove. The method of the invention for the first time provides a layer 15 having a defined layer thickness profile D, particularly with a vertical wedge. Specifically, planar substrates, for example silicon wafers, are coated such with $SiO_2$ or, respectively, doped $SiO_2$ by a local nozzle so that a gradient occurs in the layer thickness in the desired way from typically $5\mu$ to 50 $\mu$m or from $20\mu$ to 200 $\mu$m over a length of 50 mm. In the former instance, one is aimed at a laser matching and at a fiber matching in the latter instance. Preferably, the method of hydrolitic deposition is employed for example flame hydrolysis, wherein gaseous glass precursors, for example $SiCl_4$, $GeCl_4$, $BCl_3$, $PCl_3$, $TiCl_4$, etc., are injected into a narrow gas flame defining the material deposition beam 52 and are hydrolyzed therein to the corresponding oxides that are locally deposited as a result of the temperature gradient from the flame to the substrate. The layer thickness is set on the basis of a suitable relative motion. For example, a rotating dish 50 can be employed on which six or more wafers 5 are placed with identical spacing from the rotational axis 51. The burner is inclined relative to the dish and the flame sweeps the dish in tangential direction so that the mass center of gravity of the deposition is placed on a radial line 55. When the placement point of the dish is displaced in a radial direction, then a deposition with constant layer thickness is obtained when the displacement speed is modified in such a way that the dwell time per interval of the annular strip 54 to be deposited remains constant. When the displacement speed is modified so that the dwell time linearly increases per area element of the strip 54 to be deposited, for example from outside toward inside, then one obtains a wedge-shaped variation in layer thickness. By way of example, FIG. 6 graphically shows the dwell time per area for both situations. The curve I represents the dwell time for a wedge-shaped layer 15 and the curve II represents that for a layer having a constant thickness, respectively dependent on the radial spacing S from the rotational axis 51.

In one realization of an inventive arrangement, a lower cladding layer is first applied with constant layer thickness. A plurality of individual passes can be required for this purpose dependent on the throughput of the nozzle material and on the desired thickness for example 10 $\mu$m. The wedge-shaped core layer 15 is then deposited, again composed of a plurality of individual layers with the elevated refractive index typically Δn=0.025 given fiber matching or Δn=0.06 given laser matching. As known, the increase in refractive index is achieved by increasing the $GeO_2$ content of the glass. This is followed by the consolidation of the initial porous glass layer in a furnace at a temperature around 1200° C. The now highly transparent glass layer is provided with a mask layer for example, organic polymer, silicon, aluminum, titanium, etc., that is photolithiographically structured into a fan as shown in, for example, FIG. 2. The transfer of the structure of the mask to the layer occurs with the suitable etching processes (for example, dry etching with $CHF_3$ in a plasma, such as disclosed by the above article H. W. Schneider). After the etching of the waveguides, a further temperature treatment for rounding the edges can be advantageous, namely for facilitating the edge coverage in the following coating but also for improving the cross-sectional adaptation of the waveguide core and multimode waveguides. Finally, a cover glass layer is deposited with parameters similar to the buffer or cladding glass layer. In this way, many fans can be simultaneously manufactured on a silicon wafer having a diameter of 10 cm. After separation of the arrangement from the plate the edge polishing and a potential vapor-deposition for an anti-blooming of the end faces can be obtained for the arrangement or device.

Although various minor modifications might be suggested by those skilled in the art, it should be understood that I wish to embody within the scope of the patent warranted hereon all such modifications as reasonably and properly come with the scope of my contribution to the art.

I claim as my invention:

1. An arrangement for producing a conversion between a plurality of mutually separate light rays with a respectively small beam cross-section and a light ray having a larger beam cross-section, said arrangement having an optical waveguide core for each of the light rays having a small beam cross-section, each of said optical waveguide cores having a first core end face and a second core end face with a longitudinal core axis extending between the two end faces, the first core end faces having an oblong configuration in a first direction and being arranged in the first direction extending parallel to a plane allocated to the common waveguide cores for receiving light rays having the smaller beam cross-section and the second end faces of the cores being arranged for coupling light into the light ray having the larger beam cross-section, the improvements comprising each of the second end faces being fashioned to have an oblong shape extending in a second direction different from said first direction, and the core cross-section of each of the waveguide cores essentially continuously changing along the longitudinal core axis from the geometric shape of the first core end face into the geometric shape of the second core end face.

2. An arrangement according to claim 1, wherein the second direction of the second core end faces is common for each of the waveguide cores.

3. An arrangement according to claim 1, wherein the second core end faces of the waveguide cores are arranged together in a gap-free arrangement in an apparatus plane extending perpendicular to a common plane and in the first direction parallel to the common plane.

4. An arrangement according to claim 1, wherein the second core end faces of each waveguide core are arranged to extend perpendicular to the longitudinal core axis of the waveguide core.

5. An arrangement according to claim 1, wherein the first core end faces of the waveguide cores are arranged at a greater axial spacing from one another compared to the second core end faces of the waveguide cores which are positioned close together, and the longitudinal core axes of each of the waveguide cores extends in a curved path between the first core end face and the second core end faces, and is parallel to one another at each of the core end faces.

6. An arrangement according to claim 1, wherein each of the first core faces of the waveguide cores are arranged in an apparatus plane extending perpendicular to the common plane.

7. An arrangement according to claim 1, wherein the core cross-section of each light waveguide core exhibits an essentially constant cross-sectional area along the longitudinal core axis.

8. An arrangement according to claim 1, wherein the first and second core end faces of each waveguide core are essentially elongated with a rectangular shape and the core cross-section of each of the waveguide cores is essentially rectangular along the longitudinal core axis.

9. An arrangement according to claim 1, wherein each of the waveguide cores is provided with means for facilitating a mode mixing in the waveguide core.

10. An arrangement according claim 1, wherein each of the light rays having the small beam cross-section is generated by respective line of a semiconductor light sources arranged side-by-side that extend in a first direction parallel to said plane allocated in common for the waveguide cores and are coupled to the first core end faces of each of the waveguide cores and that the second core end faces of each of the waveguide cores elongated in the second direction are dimensioned so that the length are arranged in such a close proximity to one another they essentially fit into the core end face of a waveguide core of a multimode waveguide and so that the light rays having the larger beam cross-section coupled out in common from the second core end faces of the waveguide is coupled into the multimode waveguide.

11. In an arrangement according to claim 1, wherein the plane allocated in common to the waveguide cores is defined by a surface of the substrate on which the waveguide cores are constructed.

* * * * *